Figure 1:
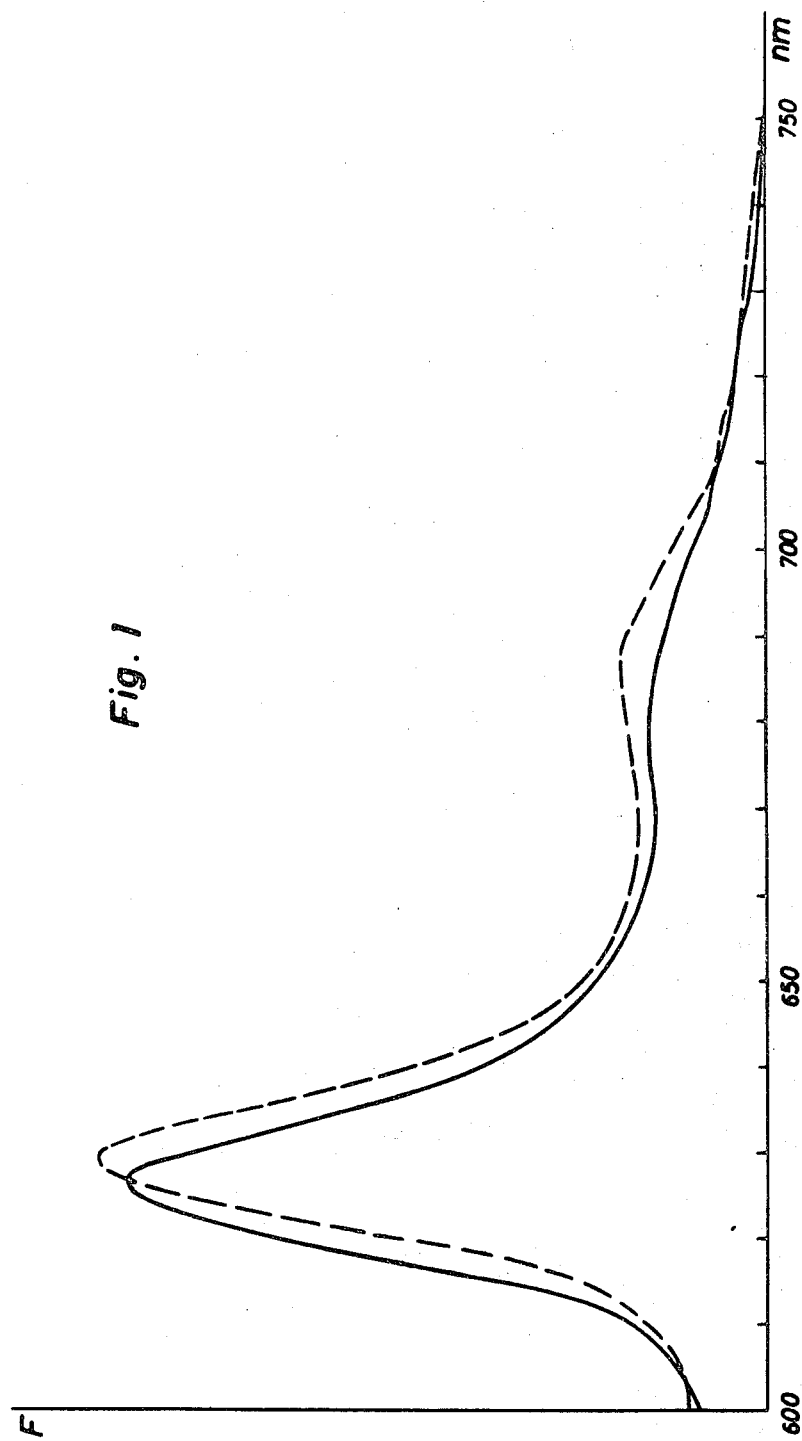
Figure 2:
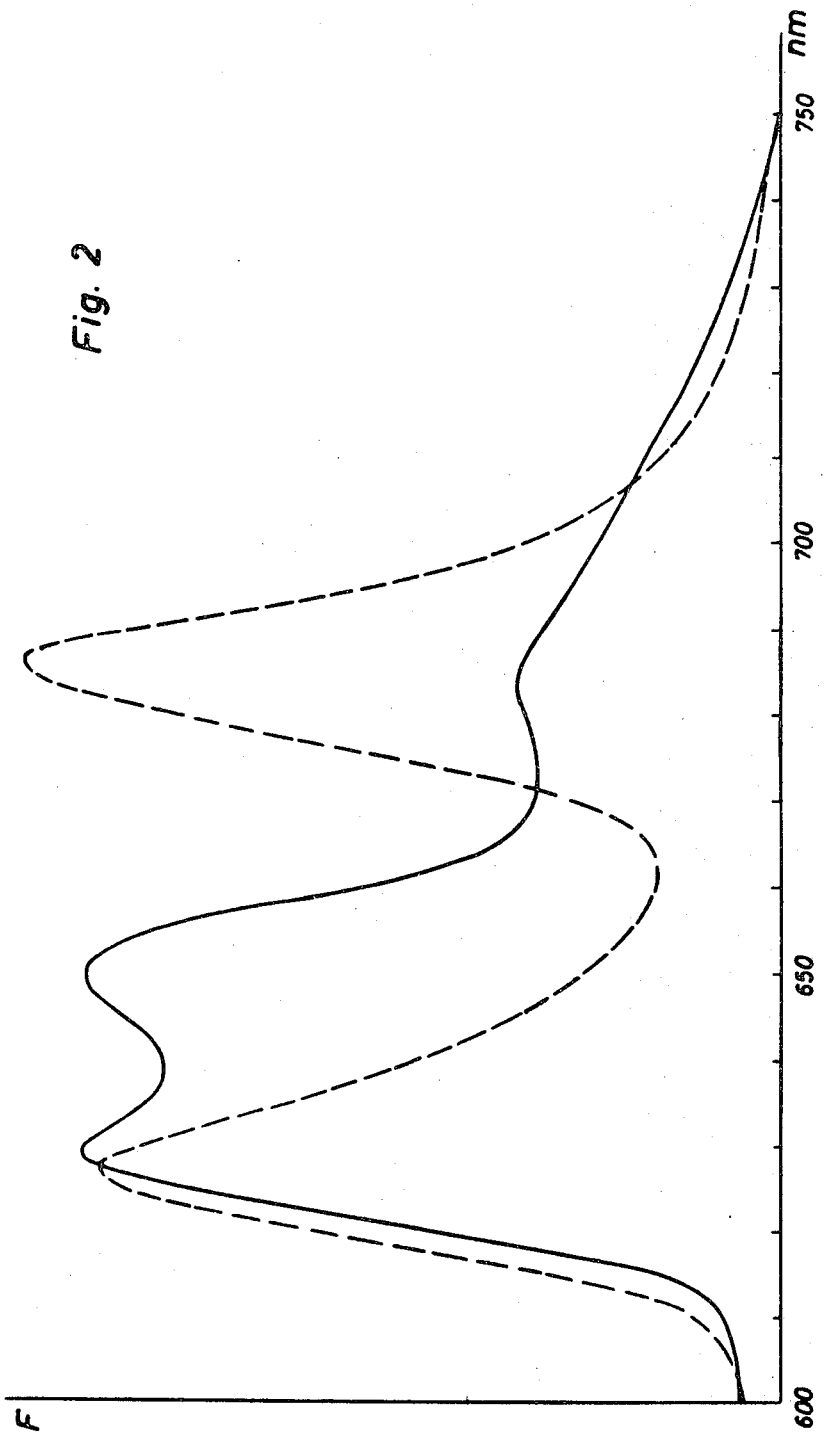

United States Patent [19]
Michel-Wolwertz et al.

[11] 3,871,888
[45] Mar. 18, 1975

[54] PHOTOSENSITIVE COMPOSITION CONTAINING A PROTOCHLOROPHYLLIDE-APOPROTEIN IN COMPLEXED OR IN ASSOCIATION WITH A POLYMERIC MATERIAL

[76] Inventors: Marie-Rose Michel-Wolwertz, Vielle Voie de Liege 107, Dolembreux; Esther Dujardin; Cyrille Sironval, both of Avenue des Bois 8, Mery-Esneux, all of Belgium

[22] Filed: Jan. 24, 1973

[21] Appl. No.: 326,442

[30] Foreign Application Priority Data
Jan. 25, 1972  Great Britain ..................... 3499/72

[52] U.S. Cl. ......................... 96/88, 260/112, 260/6, 260/8, 106/157
[51] Int. Cl. ............................................. G03c 1/00
[58] Field of Search ......... 96/88; 106/157; 260/112, 260/6, 8

[56] References Cited
OTHER PUBLICATIONS
J. H. C. Smith and D. W. Kupke, Nature, 178, (1956) 751–752.

*Primary Examiner*—Norman G. Torchin
*Assistant Examiner*—Won H. Louie, Jr.
*Attorney, Agent, or Firm*—Ernest G. Montague; Karl F. Ross; Herbert Dubno

[57] ABSTRACT

A photoactive substantially dehydrated material comprises a protochlorophyll(ide)-apoprotein complex, extracted from etiolated plant material and complexed or in association with a natural or synthetic polymeric material.

6 Claims, 2 Drawing Figures

PHOTOSENSITIVE COMPOSITION CONTAINING A PROTOCHLOROPHYLLIDE-APOPROTEIN IN COMPLEXED OR IN ASSOCIATION WITH A POLYMERIC MATERIAL

The present invention relates to a photosensitive material of biological origin which has a high stability at room temperature and to a method of producing said material.

The high stability of the photosensitive material makes it suitable for use in the recording and reproduction of information as described in the Application filed on even date herewith for "Recording and reproducing information by means of a photosensitive material of biological origin."

It is known that dark-grown (etiolated) plants undergo spectral changes under the influence of light. By short-time illumination of the etiolated plants the initial absorption maximum is irreversibly shifted from about 647 nm to about 676 nm and the initial low-temperature fluorescence emission maximum (measured in liquid nitrogen) is irreversibly shifted from about 657 nm to about 688 nm.

The protochlorophyll(ide) which has accumulated in the dark-grown plants and which is the precursor of the chlorophyll found in normal green chloroplasts is responsible for the above phenomenon by photoreduction of the protochlorophyll(ide) to chlorophyll(ide). Essential for the photoreduction of the protochlorophyll(ide) to chlorophyll(ide) is a specific binding with an apoprotein. This binary complex of protochlorophyll(ide) with apoprotein has been termed protochlorophyll(ide) holochrome.

The protochlorophyll(ide) associated to the apoprotein has been extracted from dark-grown plants e.g. with glycerine (cfr. J.H.C. Smith, Carn.Inst.Wash.Year Book No. 51, 153 (1952) and J.H.C. Smith and A. Benitez, ibid., No. 52. 51 (1953) and with buffer solutions (cfr. A.A. Kransnovskii et al, Doklady Akad.-Nauk.SSSR, 85, 177 (1952)) in a form that is transformable by light, which means that the protochlorophyll(ide) is separated from the plant in its holochromatic form.

Since then, methods have been described for the purification of the extracted photoactive protochlorophyll(ide) holochrome e.g. by Schopfer et al in Plant Physiol. 1968, 43 (6) 990-6 or to isolate the minimum unit of protochlorophyll(ide) complex that can carry on the photochemical transformation e.g. by J.H.C. Smith and D.W. Kupke in Nature, 178 (1956) 751-752 and by K. W. Henningsen and A. Kahn Plant Physiol. 47 (1971) 685-690. These methods are quite complicated and include extensive treatments in view of the objects pursued.

Though the isolated protochlorophyll(ide) holochrome extracted from etiolated plants as described in the literature can be kept, at least partly, in photoactive condition for weeks or even months provided the extracts are kept in the dark at a temperature below 0°C, preferably below −10°C, it gradually loses all photoactivity in a few days, a few hours, or even some minutes when kept at room temperature. Therefore, these protochlorophyll(ide) holochrome extracts are unsuitable for use in the recording and reproduction of information at ordinary temperature.

In accordance with the present invention it was found that the protochlorophyll(ide) holochrome could be isolated in a form such that it remains photoactive for months at room temperature by forming a so-called ternary complex of the extracted protochlorophyll(ide)-apoprotein binary complex with a natural or synthetic polymeric material e.g. polyethylene glycol, dextran, antibodies etc. and substantially dehydrating the ternary complex formed.

The term "ternary complex" will be used throughout the specification to describe the photoactive product extracted from the etiolated plant material and precipitated with the help of said natural or synthetic polymeric material. However, it is not known whether the polymeric material is actually part of the complex or whether the polymeric material is merely in association with the binary complex.

As will be illustrated hereinafter, the maintenance of long term photoactivity at room temperature of the so-called ternary complex was found to be strictly dependent on the absence of free water in the complex, only the water of constitution should remain.

The dehydrated photoactive ternary complex of the invention can be distinguished from the non-dehydrated ternary complex by its low-temperature fluorescence emission maximum after phototransformation. Whereas the dehydrated photoactive ternary complex of the invention when kept at room temperature shows a constant low-temperature fluorescence emission maximum after photoconversion that is invariably situated at about 688 nm, the non dehydrated complex, when illuminated after having been kept from some seconds to a few minutes at room temperature, shows a low temperature fluorescence emission maximum that has shifted to the shorter wavelength, though, initially it must have been at about 688 nm.

Most higher angiosperm plants when grown in the dark possess the property of producing the protochlorophyll(ide)-apoprotein complex and may be used as source material for the photoactive binary complex. The complex accumulates not only in the leaves but also in the other organs of the plant, e.g. in the buds and the petioles, and, though to a lower degree, in the stems, branches, twigs and seeds. It takes a certain time to obtain the optimum concentration of the protochlorophyll(ide) holochrome in the dark-grown plant material which time depends on the kind of plant material used. Certain leguminous plants such as beans and peas and graminaceae such as barley and maize may contain in their dark-grown leaves an appreciable content of apoprotein-protochlorophyll(ide) complex. For instance, an optimum concentration of protochlorophyll(ide)-apoprotein complex may be obtained in etiolated beans in the following way:

Bean seedlings (Phaseolus vulgaris, var.Commodore) are grown in complete darkness in pots containing sterilized vermiculite moistened with tap water. The temperature is kept at 23° ±2°C and the relative humidity is kept at about 80 percent.

The grow time necessary to obtain the optimum concentration can be easily determined for instance by taking at different time-intervals a given amount of plant material and measuring the pigment content of the leaves after extraction of the pigments. By comparing the intensity of light emission of leave samples of different ages at 657 nm (before illumination) and at 688 nm, (after illumination) it can be concluded what sample has the highest concentration of photoactive complex. It is evident that in comparing the samples, all physical circumstances of excitation of the fluorescence should be the same.

The photoactive ternary complex of protochlorophyll (ide)-apoprotein with a natural or synthetic polymeric material can be obtained by the following steps:

The ternary complex of protochlorophyll(ide)-apoprotein with a polymeric material is formed by addition to the supernatant liquid of any polymeric material including a proteinaceous material, that is capable of forming a precipitate with the protochlorophyll-(ide)-apoprotein. The precipitate of so-called ternary complex is then collected by centrifugation.

The etiolated plant material from which the protochlorophyll(ide)-apoprotein complex should be extracted, is ground in a dark cold room in the presence of a buffer maintaining the pH between about 7 and about 10 and a compound protecting the protein against oxidation or denaturation e.g. glycerol, polyvinyl pyrrolidone, triethanolamine and saccharose. The amount of buffer and protective agent used is such that the volume to be ground is kept as low as possible. Grinding may occur manually in a mortar or by means of a mechanical or electric grinder provided no active radiation is emitted by the mechanism and motors used.

The coarse debris is removed from the homogenate by filtering through a filter with large pores e.g. by squeezing through a cloth whereupon the filtrate is centrifuged e.g. for 30 to 60 minutes at speeds in the order of 5.000 to 30.000 or more depending on the viscosity of the medium. The supernatant liquid containing the photoactive protochlorophyll(ide)-apoprotein complex is collected and used to prepare the ternary complex.

The ternary complex of protochlorophyll(ide)-apoprotein with a polymeric material is formed by addition of any polymeric material including a proteinaceous material, that is capable of forming a complex with the protochlorophyll(ide)-apoprotein, to the supernatant liquid and collecting the precipitate by centrifugation.

All solutions and equipment used during the extraction of the binary complex and the formation of the ternary complex are kept at low temperature, say below 5°C. Whenever vision is necessary, a dim green safelight may be used during these operations as well as during etiolation.

The green safelight should be of low intensity and emit mainly radiations within the region of 500 to 600 nm, which do not cause phototransformation of the photoactive protochlorophyll(ide)-apoprotein complex which has its main absorption in the UV-blue region of the spectrum (maximum at about 436 nm) and red region of the spectrum (maximum at about 647 nm for the leave and at 635–645 nm for the extracted binary complex and the ternary complex formed.)

The following preparations give more details as to the preparation of photoactive ternary complex.

PREPARATION 1

The two primary leaves of etiolated beans (Phaseolus vlugaris var. Commodore) were collected 21 days after germination. From 2 to 2.5 g of these leaves were ground in a mortar with 6.0 ml of a solution of glycine (0.2M) and potassium hydroxide at pH about 9.3, in the presence of 40 percent (vol/vol) of glycerol. Grinding was done in a dark cold room at about 4°C using a green safelight lamp with maximum transmission at 520 nm.

The homogenate was squeezed through a fine woven cloth and the filtrate centrifuged for 45 minutes at 26,000 the temperature being kept at +3°C.

The supernatant liquid was collected whereupon a 50 percent aqueous solution of polyethylene glycol (average molecular weight 6000) was added dropwise at 3°C to give a final concentration of 15 percent. The mixture was left standing for 30 minutes whereupon it was centrifuged for 1 hour at −4°C at a speed of 48.500. The supernatant liquid was removed and the precipitate, which is a so-called ternary complex of protochlorophyll(ide)-apoprotein with polyethylene glycol, was collected.

PREPARATION 2

40 g of etiolated bean leaves as described in preparation 1 were placed in a mixer whereupon were added: 20 g of polyvinylpyrrolidone and 160 ml of the buffer comprising 0.05 mole of tricine, 0.05 mole of potassium hydroxide, 0.002 mole of magnesium sulphate, 0.001 mole of ethylene diamine tetra-acetic acid disodium salt and 0.06 percent (vol/vol) of the dispersing agent tert.octyl-phenoxy-polyethyleneoxy ethanol commercially available under the trade name TRITON X–100 from the Rohm & Haas Company, Philadelphia, U.S.A., as well as 40 percent (vol/vol) of glycerol. The viscosity of the buffer was 3 cP and the pH 8.6. The whole was mixed for 2 minutes at maximum speed of the mixer while maintaining the temperature at 3°C.

The homogenate was filtered through muslin and the filtrate was centrifuged for 1 hour at −4°C at a speed of 78,500 g.

The supernatant liquid was collected and further treated as in preparation 1 to form the ternary complex.

PREPARATION 3

The primary etiolated leaves of maize were collected 12 days after germination. 10 g of leaves were ground for 10 min. at a temperature of 0°C in a mortar with 40 ml of a phosphate buffer saturated with saccharose. The buffer had pH 9 and a viscosity of 21 cP.

The homogenate was then filtered through muslin, and the filtrate centrifuged for 1 hour at −4°C at a speed of 78,500.

The supernatant liquid was collected and further treated as in preparation 1 to form the ternary complex.

PREPARATION 4

Preparation 2 is repeated with the difference that the precipitation at +3°C of the protochlorophyll(ide)-apoprotein now occurs by addition of a solution of antibodies to the supernatant liquid of the centrifugation. These antibodies are synthesized by a rabbit which had been injected previously with a solution of the protochlorophyll(ide)-apoprotein complex (three injections one injection per week).

The precipitate formed is collected by centrifuging for 1 hour at −4°C at a speed of 48,500 g.

By the formation of a ternary complex of the protochlorophyll(ide)-apoprotein complex with a polymeric material as described above high yields of photoactive complex are obtained by simple operations such as grinding, centrifuging and precipitation. This ternary complex can be stored for several months in photoactive condition when kept at temperatures below −15°C. However, at room temperature it has completely lost all photoactivity after a day or two.

As already noted above, the maintenance of long term photoactivity at room temperature of the ternary complex was found to be stricly dependent strictly the absence of free water in the complex. This is clearly apparent from the spectral analysis of lyophilized and non-lyophilized ternary complex. The ternary complex, immediately after its preparation, has a low temperature (measured in liquid nitrogen i.e. at −196°C.) fluorescence emission maximum in the red region of the spectrum which may vary from 645 nm to 655 nm from preparation to preparation e.g. 648 nm. By complete, short-time photo-conversion after preparation this low temperature fluorescence emission maximum is shifted to about 688 nm. Through denaturation of the unexposed ternary complex the said complex shows, after short time illumination to effect complete photoconversion, a low temperature fluorescence emission maximum at about 688 nm as well as a low temperature fluorescence emission maximum at about 625–630 nm, the 625–630 nm emission band resulting from photoinactive protochlorophyll(ide)-apoprotein. As denaturation of the photoactive complex proceeds, the 625–630 nm emission band increases and the 688 nm emission band decreases.

In the following Example 1 it is shown that at room temperature, the non-lyophilized ternary complex has lost completely its photoactivity after two days whereas the lyophilized solid green ternary complex remains photoactive for several months.

EXAMPLE 1

A. Measurement of the denaturation of non-lyophilized ternary complex

A portion of the ternary photoactive complex freshly prepared as described in preparation 1 was applied by means of a spatula as a very thin layer to filter paper. In a similar way a whole series of samples were made. The samples were divided into three parts and each part was placed in a light-tight metal box functioning as dark room. The boxes were stored at three different temperatures: −10°C, 0°C and 23°C.

In order to follow the denaturation, 2 samples of each of the portions stored at different temperatures were taken at different time-intervals e.g. every 2 days. At each time interval the low temperature fluorescence emission spectra were recorded on the one hand of a non-illuminated sample and on the other hand of a sample which has received a saturating flash exposure (1/700 sec. - 160 Ws) by means of a Multiblitz Gerate, Dr. Ing. Mannesmann, Porz-Westhoven, Germany, placed some mm from the sample. The sample was frozen in liquid nitrogoen immediately after illumination.

The fluorescence emission spectra were measured as described by C. Sironval et al for etiolated leaf samples in Photosynthetica 2 (4), 1968, 268–287, but using now instead of the leaf samples, samples of the illuminated or non-illuminated ternary complex.

The recorded spectra permit
a. to investigate whether the samples have been properly stored without being exposed to light (non-illuminated sample) and
b. to determine the percentage of denaturation of the ternary complex (illuminated sample) by means of the index D:

$$D \% = (H_{628})/H_{628} + H_{688} \times 100$$

in which
$H_{628}$ stands for the height of the fluorescence emission maximum at 628 nm, and
$H_{688}$ stands for the height of the fluorescence emission maximum at 688 nm.

The results attained are given hereinafter.

B. Measurement of the denaturation of lyophilized ternary complex

The ternary photoactive complex obtained as described in preparation 1 was applied by means of a spatula as a very thin layer on filter paper. In a similar way a whole series of samples were made.

The samples were then lyophilized for 2–3 days at a temperature of about −13°C and a vacuum of 2–3 microns of mercury.

The samples were divided into three equal parts. Each part was placed in a light-tight metal box in which the atmosphere was kept dry by means of calcium chloride. One box was stored at −10°C, another at 0°C and the remaining one at 23°C.

In order to follow the denaturation, two samples were taken from the different boxes at various time intervals and at each time interval the low temperature fluorescence emission spectra were recorded as described above for the non-lyophilized ternary complex.

C. Results

The results show that for the non-lyophilized ternary complex the denaturation at −10°C increases after preparation with 3 percent after 2 weeks, with 7 percent after 1 month and with 10 percent after 2 months whereas the denaturation at 0° increases after preparation with 30 percent after 2 weeks, with 38 percent after 1 month and with 50 percent after 2 months.

At ordinary temperature (23°C) the non-lyophilized ternary complex is completely denaturated in less than 2 days after preparation.

The lyophilized ternary complex undergoes during lyophilization a denaturation of about 12 percent. At −10°C as well as 0°C there is a slight renaturation for about 1 month whereupon there is a slight denaturation after several months of storing. At ordinary temperature the lyophilized ternary complex undergoes a further denaturation of 38 percent after a week which is followed by a renaturation so that Multiblitz 50 electronic flash marketed by Gesellschaft fur Multiblitz Gerate, month after lyophilization the denaturation has increased with only about 12 percent. Even 7 nitrogen months after lyophilization denaturation has increased with less than 15 percent.

For illustration purposes low-temperature fluorescence emission spectra (relative fluorescence: F versus wavelength: nm) are given in the accompanying drawings which were obtained before (solid-line) and after (dash-line) photoconversion by means of 1 flash as described above of the non-lyophilized ternary complex which had been stored for 2 days at room temperature (FIG. I), and of the lyophilized ternary complex which had been stored at room temperature for 45 days after lyophilization (FIG. II).

From FIG. I it is clearly apparent that the nonlyophilized complex is no longer photoactive after having been stored for 2 days at room temperature and FIG.

II shows that the lyophilized complex is still photoactive even after having been stored for 45 days at room temperature.

As will be illustrated in the following example 2 the stable lyophilized ternary complex can be used for the recording and reproduction of information. More information about the utility of the lyophilized ternary complex as photoactive substance in the recording and reproduction of information can be found in copending Patent Application filed on even date herewith for "Recording and reproducing information by means of a photosensitive material of biological origin."

EXAMPLE 2

A copper plate is covered with cardboard having a rectangular opening. The opening is filled up by means of the ternary complex described in preparation 1 whereupon the complex is lyophilized at −13°C and 2–3 microns Hg.

The lyophilized layer of ternary complex is brought into contact with a transparent original whereupon it is exposed by means of a saturating flash as described in Example 1 placed at a distance of 30 cm.

The exposed plate carrying the recorded information is then placed in a Dewar in liquid nitrogen medium to avoid further phototransformation. While being in the Dewar, the material is exposed to radiations of a mercury vapour lamp through a band filter with peak transmission at 442 nm, a bandwidth at half peak transmission from 422 to 472 nm and a bandwidth at one-twentieth peak transmission from 416 nm to 490 nm. By the exciting radiation, the exposed areas have a low temperature fluorescence emission at about 688 nm whereas the unexposed areas have a low temperature fluorescence emission with a peak at about 650 nm.

When viewing the plate through a filter transmitting all light of wavelength beyond 660 nm a direct positive image of the original is clearly perceptible which can be recorded on photographic silver halide elements.

We claim:
1. A process for preparing a photoactive material of biological origin remaining photoactive at room temperature which comprises the steps of
   a. extracting from an etiolated plant material a photoactive protochlorophyll(ide)-apoprotein binary complex with a buffer solution at a pH between 7 and 10 in the presence of an agent to protect the apoprotein against denaturation at a temperature of at most 5°C;
   b. adding to said binary complex at a temperature of at most 5°C a natural or synthetic polymeric material selected from the group consisting of polyethylene glycol, polyvinylpyrrolidone and dextran to form a precipitate;
   c. cold-centrifuging said precipitate of said binary complex to form a product which is either in complexed or in association with said polymeric material, and
   d. lyophylizing said product at a temperature of at most 5°C so that the dried final product remains photoactive at room temperature.

2. The process as defined in claim 1 in step (a) wherein the buffer solution is selected from the group consisting of glycerol/potassium hydroxide, tricine/potassium hydroxide and phosphates and the protective agent contained in said buffer is a glycerol.

3. The process as defined in claim 2 in step (a) wherein etiolated bean or maize leaves are used as etiolated plant material.

4. The process as defined in claim 2 in step (b) wherein the polymeric material is poly-ethylene glycol.

5. The process as defined in claim 2 in step (d) wherein the lyophylizing occurs at a temperature below − 10°C in a vacuum of the order of a few microns of Hg.

6. The photoactive material made by the process of claim 1.

* * * * *